(12) United States Patent
Sakashita et al.

(10) Patent No.: US 6,455,151 B1
(45) Date of Patent: Sep. 24, 2002

(54) BASE FILM FOR PRESSURE-SENSITIVE ADHESIVE TAPE AND PRESSURE-SENSITIVE ADHESIVE TAPE OR SHEET

(75) Inventors: Teiji Sakashita; Takio Itou; Yoshio Nakagawa; Kazuhiko Kinpara; Katsumi Hori; Hiroshi Nagami, all of Osaka (JP)

(73) Assignee: Nitto Denko Corporation, Osaka (JP)

( * ) Notice: Subject to any disclaimer, the term of this patent is extended or adjusted under 35 U.S.C. 154(b) by 160 days.

(21) Appl. No.: 09/619,309

(22) Filed: Jul. 19, 2000

(30) Foreign Application Priority Data

Jul. 23, 1999 (JP) .............................. 11-208425

(51) Int. Cl.$^7$ ................................. C09J 7/02
(52) U.S. Cl. .................. 428/343; 428/354; 428/356; 428/516; 428/517; 428/523; 427/208.4
(58) Field of Search ................. 428/343, 354, 428/356, 516, 517, 523; 427/208.4

(56) References Cited

U.S. PATENT DOCUMENTS

| 4,071,652 A | | 1/1978 | Brullo | |
| 6,096,420 A | * | 8/2000 | Wilhoit | 428/343 |

FOREIGN PATENT DOCUMENTS

| EP | 0 763 584 A1 | 3/1997 |
| JP | 61-167551 | 7/1986 |
| JP | 61-195837 | 8/1986 |
| JP | 64-995 | 1/1989 |
| JP | 3-11317 | 2/1991 |
| JP | 6-166294 | 6/1994 |
| JP | 6-166295 | 6/1994 |
| JP | 9-71754 | 3/1997 |

* cited by examiner

Primary Examiner—Daniel Zirker
(74) Attorney, Agent, or Firm—Whitham, Curtis & Christofferson, PC

(57) ABSTRACT

A base film for pressure-sensitive adhesive tapes and sheets which comprises a tackifier resin; and a pressure-sensitive adhesive tape or sheet which has a film having at least one layer of the base film as a substrate and a pressure-sensitive adhesive layer formed on at least one face of the substrate.

Pressure-adhesive tapes or sheets which have excellent effects of undergoing little dimensional change even under heating or with the passage of time, showing good appearance without suffering from gapping, etc. in case of rolled tapes and sustaining stable pressure-sensitive adhesive force. Particularly favorable effects can be achieved in pressure-sensitive adhesive tapes wherein a polyolefin resin is used as the base film and a rubber pressure-sensitive adhesive containing a large amount of a tackifier resin is used as the pressure-sensitive adhesive.

10 Claims, 1 Drawing Sheet

BASE FILM FOR PRESSURE-SENSITIVE ADHESIVE TAPE AND PRESSURE-SENSITIVE ADHESIVE TAPE OR SHEET

FIELD OF THE INVENTION

This invention relates to a base film for a pressure-sensitive adhesive tape and a pressure-sensitive adhesive tape or sheet with the use of this base film as the substrate. This pressure-sensitive adhesive tape or sheet undergoes little dimensional change even under heating or with the passage of time. Particularly favorable effects can be achieved by using a pressure-sensitive adhesive tape or sheet wherein a polyolefin resin is used as the base film and a rubber pressure-sensitive adhesive containing a large amount of a tackifier resin is used as the pressure-sensitive adhesive.

DESCRIPTION OF THE RELATED ART

Pressure-sensitive adhesive tapes have been widely employed in, for example, packaging, bonding, surface-protecting, masking, labeling and indicating in various industrial fields. In general, a pressure-sensitive adhesive tape comprises a pressure-sensitive adhesive for achieving the aimed performance and a base film for protecting and reinforcing the pressure-sensitive adhesive and imparting a smooth surface thereto.

Examples of known pressure-sensitive adhesives include rubber pressure-sensitive adhesives containing two components (namely, so-called a polymer elastomer and a tackifier) which are obtained by blending a rubber elastomer (for example, natural rubber, polyisoprene, polyisobutylene, butyl rubber, styrene/butadiene rubber) employed as the main component with a tackifier resin; acrylic pressure-sensitive adhesives made of polyacrylate optionally copolymerized with vinyl monomers (for example, vinyl acetate, methacrylates, acrylic acid, methacrylic acid); vinyl pressure-sensitive adhesives obtained by adding a plasticizer to a vinyl polymer (for example, vinyl chloride/vinyl acetate copolymer, polyvinyl acetate); and silicone pressure-sensitive adhesives containing rubbery siloxane and resin siloxane.

With respect to base materials for pressure-sensitive adhesive tapes, on the other hand, adequate ones are selected depending on, for example, the purpose of use from among various ones such as papers (for example, Japanese paper, kraft paper), fabrics (for example, cotton, stable fibers, synthetic fibers, non-woven fabric), plastics (for example, cellophane, polyethylene, polyester, polyvinyl chloride, acetate, polypropylene, polyethylene terephthalate, polystyrene, polyacrylonitrile) and metal foils.

It is frequently observed that these pressure-sensitive adhesive tapes, which are wound into rolls in many cases, undergo deformation such as gapping upon heating or with the passage of time. When pressure-sensitive adhesive tapes for indication or surface-protection are adhered to adherends, the base materials sometimes swell and thus cause lifting upon heating or with the passage of time.

These phenomena, which are caused by dimensional changes of the base materials, are particularly remarkable in pressure-sensitive adhesive tapes where a polyolefin resin is used as a base film and a rubber adhesive in which a large amount of a tackifier resin is compounded is used as an adhesive.

SUMMARY OF THE INVENTION

To overcome these problems encountering in the related art, the inventors have conducted intensive studies. As a result, they have found that a pressure-sensitive adhesive tape having a base film to which a tackifier resin has been preliminarily added undergoes little dimensional change even under heating or with the passage of time, thereby completing the invention.

Accordingly, the invention relates to a base film for a pressure-sensitive adhesive tape; and a pressure-sensitive adhesive tape or sheet which has a film having at least one layer of the base film as described above as the substrate and a pressure-sensitive adhesive layer formed on at least one face of the substrate.

Although it has not been clarified so far how these effects can be achieved, it is assumed that the tackifier resin might be prevented from migration from the pressure-sensitive adhesive layer toward the base material layer. Particularly remarkable effects can be achieved in pressure-sensitive adhesive tapes wherein a polyolefin resin is used as the base film and a rubber pressure-sensitive adhesive containing a large amount of a tackifier resin is used as the pressure-sensitive adhesive. This is seemingly because the tackifier resin can easily migrate owing to the high compatibility of the tackifier resin with the polyolefin resin.

The pressure-sensitive adhesive tapes of the invention are characterized by showing not only little dimensional change but little change in pressure-sensitive adhesive force.

Figure 1:
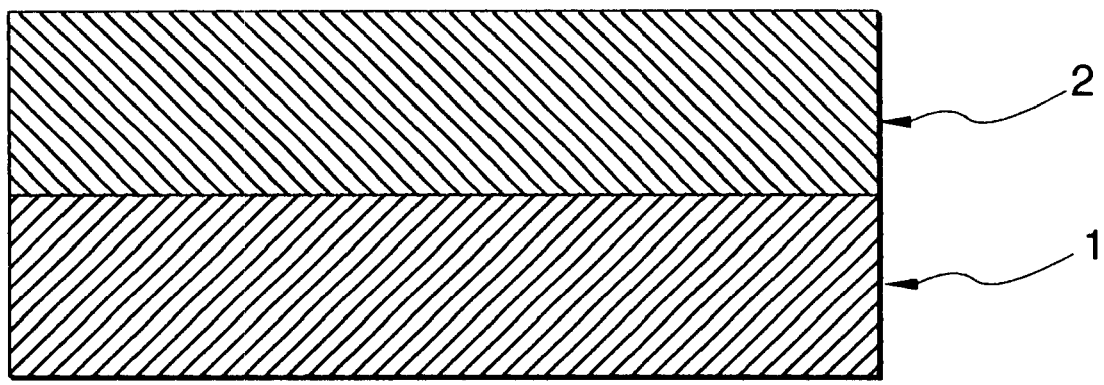
FIG. 1 provides a schematic sectional view of an example of a pressure-sensitive adhesive tape wherein a pressure-sensitive adhesive layer is formed on the base film for a pressure-sensitive adhesive tape of the invention.

In this figure, each numerical symbol has the following meaning:

1: a substrate having at least one layer of a base film containing a tackifier resin; and 2: a pressure-sensitive adhesive layer.

DETAILED DESCRIPTION OF THE INVENTION

Now, the invention will be described by reference to the attached figure, but it should be understood that the invention is not construed as being limited thereto.

FIG. 1 provides a schematic sectional view of an example of a pressure-sensitive adhesive tape wherein a pressure-sensitive adhesive layer is formed on the base film for the pressure-sensitive adhesive tape of the invention. The pressure-sensitive adhesive tape may be wound into a roll or provided with an appropriate release paper adhered to the pressure-sensitive adhesive face (not shown).

In FIG. 1, 1 stands for a substrate having at least one layer of a base film containing a tackifier resin.

The base material to be used in the invention may be an arbitrary one, so long as it can contain a tackifier resin. For example, use may be made therefor of papers, plastic films, foamed materials or non-woven fabrics having either a single-layer structure or a multi-layer structure.

When a polyolefin resin is used as the base material, deformation such as gapping frequently arises. Therefore, it preferable to apply the invention thereto so as to prevent these phenomena and achieve stable performance. Preferable examples of the polyolefin resin to be used herein include those containing as the main component polyethylene, polypropylene, copolymers thereof and mixtures thereof (e.g., a mixture comprising at least one of polyethylene, propylene and a copolymer thereof) and well known ones are usable therefor.

As the tackifier resin contained in the substrate 1, use may be made of conventionally known ones. For example, it is appropriate to use therefor synthetic petroleum resins, terpene resins, terpene phenol resins, aromatic modified terpene resins, cumarone-indene resin, natural resin rosin, modified rosin, glycerol ester rosin, pentaerythritol ester rosin, allylphenol formaldehyde resins, xylene formaldehyde resins, alicyclic petroleum resins, styrene resins and dicyclopentadiene resins. Either one of these resins or a mixture thereof may be used.

The tackifier resin to be used herein may be either the same as the tackifier resin to be contained in the pressure-sensitive adhesive as will be described hereinafter or different therefrom.

The content of the tackifier resin in the substrate 1 is appropriately determined depending on, for example, the type, molecular weight and SP value of the tackifier resin employed, the type of the base material to which the tackifier resin is to be added, the type of the pressure-sensitive adhesive, and the concentration of the tackifier resin in the pressure-sensitive adhesive layer. It is necessary to use the tackifier resin in such an amount as to give a base material dimensional change rate, as will be described hereinafter, of not exceeding ±0.5%, preferably not exceeding ±0.4%, more preferably not exceeding ±0.2%. In case where the base material dimensional change rate falls within the scope of ±0.5%, there arises no trouble such as a change in roll appearance (for example, gapping) or lifting. More particularly speaking, the content of the tackifier resin ranges from 1 to 50% by weight, still preferably from 2 to 25% by weight. When the content of the tackifier resin is less than 1% by weight, only poor effects of stabilizing the dimension or adhesive force tend to be achieved. On the other hand, when the content thereof exceeds 50% by weight, the surface of the base film tends to become sticky.

The substrate 1 is not restricted to a single-layer one. Namely, films of different types may be laminated thereon depending on the purpose of use.

The base material of the invention may further contain various additives commonly employed in the art (for example, ultraviolet absorbers, antistatic agents, antioxidants, aging inhibitors, coloring matters (pigments), slip agents) depending on the purpose without departing from the spirit of the invention.

The plastics such as the polyolefin resin as cited above, tackifier resins and other additives to be used in the invention may be mixed by using a method conventionally employed in the field of synthetic resins, for example, dry-blending with the use of a mixer such as a Henschel mixer, or melt-kneading with the use of a Banbury mixer, a kneader, a roll mill or a screw type extruder.

In the invention, the base film as described above may be produced by an arbitrary method without restriction. For example, a film can be formed by mixing the components by a method selected from those cited above and processing the thus obtained mixture by the T-die method, the inflation method or the calendering method.

A base film having two or more layers laminated on each other may be obtained by, for example, a well known film formation method by the multi-layer co-extrusion, a method wherein films having been formed separately are contact bonded under heating, or a lamination method wherein adhesive layers are formed with the use of various adhesives.

After the completion of the film formation, the base film thus obtained may be subjected to monoaxial or biaxial stretching as commonly employed in processing polyethylene or polypropylene.

To further elevate the adhesive force (anchoring force) of the base film to the pressure-sensitive adhesive layer, the face of the base film on which the pressure-sensitive adhesive layer has been formed may be further surface-treated by corona discharge or plasma treatment.

By using the resin containing the tackifier resin obtained above, it is also possible to form a foamed material or a non-woven fabric containing the tackifier resin by a well known method.

When an existing paper, foamed material or non-woven fabric is to be used as the base material, it is also possible that the base material is impregnated with a solution prepared by dissolving the tackifier resin in an appropriate solvent.

The thickness of the base film for pressure-sensitive adhesive tapes of the invention is not particularly restricted but appropriately determined depending on the purpose of use. It is preferable that the thickness thereof ranges form 12 to 200 μm. In case of a base film having a multi-layered structure, the thickness of each layer may have an arbitrary thickness.

In FIG. 1, 2 stands for a pressure-sensitive adhesive layer. The pressure-sensitive adhesive to be used in the pressure-sensitive adhesive tapes of the invention may be appropriately selected from among commonly employed ones (for example, acrylic, natural rubber, synthetic rubber and silicone pressure-sensitive adhesives) without particular restriction. When a rubber pressure-sensitive adhesive is used, there frequently arises deformation such as gapping upon heating or with the passage of time. Accordingly, it is preferable to apply the invention to synthetic rubber pressure-sensitive adhesives so as to achieve remarkable effects.

The thickness of the pressure-sensitive adhesive layer 2 may be determined by the purpose of use without particular restriction. In general, the thickness preferably ranges from 1 to 1,000 μm, still preferably from 2 to 200 μm.

In the invention, the face having no pressure-sensitive adhesive applied thereon may be coated with a release agent so that the tape roll can be easily unwound.

Although the uses of the pressure-sensitive adhesive tapes or sheets of the invention are not restricted at all, these products are adequately usable as indication line tapes owing to the excellent dimensional stability and pressure-sensitive adhesive force. Also, they have favorable properties as pressure-sensitive adhesive tapes for surface protection and packaging tapes.

EXAMPLES

The present invention will be described in greater detail by reference to the following Examples, but it should be understood that the invention is not construed as being limited thereto.

Example 1

100 parts by weight of low-density polyethylene (SUMIKATHENE™ G-201; manufactured by Sumitomo Chemical Co., Ltd.) and 10 parts by weight of an alicyclic petroleum tackifier resin (QUINTONE™ N-295; manufactured by Nippon Zeon Co., Ltd.) were dry-blended and then the resultant blend was molded into a film of 100 μm in thickness by extruding from a T-die extrusion molding machine (40 mm in diameter) at a resin temperature of 220° C. Onto one face of the film, a silicone release agent (KNS-309/PL-8=100/2; manufactured by Shin-Etsu Chemical Co., Ltd.) was applied to give a thickness of 1.0 μm. On the other hand, a mixture (50/50 by weight) of a styrene/isoprene copolymer pressure-sensitive adhesive (KRATON™ 1107; manufactured by Shell Chemical) with a terpene tackifier resin (CLEARON™ M M-105; manufactured by Yasuhara Chemical) was applied on the other face thereof to give a thickness of 40 μm, thereby giving a pressure-sensitive adhesive tape.

Example 2

A pressure-sensitive adhesive tape was obtained as in Example 1 but varying the blending ratio of the film, i.e., using 100 parts by weight of the low-density polyethylene and 20 parts by weight of the tackifier resin.

Example 3

50 parts by weight of a propylene homopolymer (NOBLEN™ FS-2011D; manufactured by Sumitomo Chemical Co., Ltd.), 40 parts by weight of an ethylene/propylene random copolymer (NOBLEN™ S-131; manufactured by Sumitomo Chemical Co., Ltd.), 10 parts by weight of low-density polyethylene (SUMIKATHENE™ G-201; manufactured by Sumitomo Chemical Co., Ltd.), 6 parts by weight of white color pellets (PEONY™ manufactured by Dainippon Ink and Chemicals, Inc.) and 10 parts by weight of an alicyclic petroleum tackifier resin (ARKON™ M-90; manufactured by Arakawa Kagaku) were dry-blended and then the resultant blend was molded into a film of 100 μm in thickness by extruding from a T-die extrusion molding machine (40 mm in diameter) at a resin temperature of 240° C. Onto one face of the film, a silicone release agent (KNS-309/PL-8=100/2; manufactured by Shin-Etsu Chemical Co., Ltd.) was applied to give a thickness of 1.0 μm. On the other hand, amixture (100/70 by weight) of a styrene/isoprene copolymer pressure-sensitive adhesive (KRATON™ 1107; manufactured by Shell Chemical) with a terpene tackifier resin (ARKON™ M-90; manufactured by Arakawa Kagaku) was applied on the other face thereof to give a thickness of 40 μm, thereby giving a pressure-sensitive adhesive tape.

Comparative Example 1

A pressure-sensitive adhesive tape was obtained as in Example 1 but using the low-density polyethylene (SUMIKATHENE G-201; manufactured by Sumitomo Chemical Co., Ltd.) alone as the film composition.

Comparative Example 2

A pressure-sensitive adhesive tape was obtained as in Example 1 but using polypropylene (NOBLEN™ FS-2011D; manufactured by Sumitomo Chemical Co., Ltd.) alone as the film composition.

Comparative Example 3

A pressure-sensitive adhesive tape was obtained as in Example 3 but removing the tackifier resin component alone from the film composition of Example 3.

Test Example

The properties of the pressure-sensitive adhesive tapes of Examples 1 to 3 and Comparative Examples 1 to 3 as described above were tested by the following methods. The items tested involve base material dimensional change rate, roll appearance, lifting-resistance, pressure-sensitive adhesive force and pressure-sensitive adhesive force change rate. Table 1 summarizes the results.

(1) Base Material Dimensional Change Rate

Samples of 25 mm in width and 300 mm in length were cut from a pressure-sensitive adhesive tape and a base sheet onto which the pressure-sensitive adhesive had not been applied. Then each sample was marked lengthwise with lines at an interval of 250 mm. After storing at 70° C. for 2 days, the interval between the mark lines on each sample was measured. Thus, the dimensional change rate and the base material dimensional change rate were calculated as follows.

Dimensional change rate=(line interval after storing at 70° C. for 2 days−line interval before storing)/(line interval before storing).

Base material dimensional change rate=(dimensional change rate of pressure-sensitive adhesive tape)−(dimensional change rate of base sheet).

The dimensional change rate of the base sheet was subtracted from the dimensional change rate of the pressure-sensitive adhesive tape so as to relieve the scattering in the elongation caused by scattering in the tension in the step of the film formation.

(2) Roll Appearance

A pressure-sensitive adhesive tape of 50 mm in width and 50 m in length was wound into a roll. After storing at 70° C. for 2 days, the appearance of the roll was evaluated with the naked eye.

(3) Lifting-resistance

A pressure-sensitive adhesive tape having been stored at ordinary temperature was contact bonded to a vinyl chloride-coated steel plate having a surface roughness (Ra) of 9.8 μm by moving a roller (2 kg) back and forth once to give a test piece. After storing at 50C for 1 day, the lifting of the tape was evaluated with the naked eye.

(4) Pressure-sensitive Adhesive Force

Pressure-sensitive adhesive tape samples were stored at room temperature for 2 days or in an atmosphere at 70° C. for 2 days. Then each sample was cut into a piece of 20 mm in width and bonded to a stainless plate by moving a rubber roller (2 kg) back and forth once. 30 minutes thereafter, the pressure-sensitive adhesive force was measured with a tensile tester at a speed of testing rate of 300 mm/min at a peeling angle of 180°.

(5) Pressure-sensitive Adhesive Force Change Rate

The pressure-sensitive adhesive force change rate was calculated in accordance with the following formula.

Pressure-sensitive adhesive force change rate=(pressure-sensitive adhesive force after storing at 50° C. for 2 days−pressure-sensitive adhesive force after storing at room temperature for 2 days)/(pressure-sensitive adhesive force after storing at room temperature for 2 days).

TABLE 1

|  | Ex. 1 | Ex. 2 | Ex. 3 | Comp. Ex. 1 | Comp. Ex. 2 | Comp. Ex. 3 |
| --- | --- | --- | --- | --- | --- | --- |
| Base material composition | low-density polyethylene: 100 wt. part tackifier resin: 10 wt. part | low-density polyethylene: 100 wt. part tackifier resin: 20 wt. part | propylene homopolymer: 50 wt. part ethylene/propylene random copolymer: 40 wt. part low-density polyethylene: 10 wt. part white color pellets: 6 wt. part tackifier resin: 10 wt. part | low-density polyethylene alone (Ex. 1) | poly-propylene alone (Ex. 1) | no tackifier resin (Ex. 3) |
| (1) Base material dimensional change rate | −0.04% | −0.40% | −0.04% | +1.48% | +0.72% | +1.05% |
| (2) Roll appearance | No change | No change | No change | Gapping | Gapping | Gapping |
| (3) Lifting-resistance | No lifting | No lifting | No lifting | Completely lifting | Partly lifting (ca. 20%)* | Completely lifting |
| (4) Pressure-sensitive adhesive force (g/20 mm) After forming: | | | | | | |
| room temp. × 2 days | 2200 | 2100 | 1260 | 2350 | 2500 | 1220 |
| 70° C. × 2 days | 2180 | 2180 | 1270 | 1410 | 1640 | 850 |
| (5) Pressure-sensitive adhesive force change rate | −0.9% | +3.8% | +0.8% | −40.0% | −34.4% | −30.3% |

*The ratio (length) of the lifted part to the adhesion part.

The pressure-sensitive adhesive tapes of the invention undergo little dimensional change even upon heating or with the passage of time and exhibit favorable appearance without suffering from gapping when wound into a roll. Moreover, these pressure-sensitive adhesive tapes sustain stable pressure-sensitive adhesive force.

The entire disclosure of each and every foreign patent application from which the benefit of foreign priority has been claimed in the present application is incorporated herein by reference, as if fully set forth.

What is claimed is:

1. A pressure-sensitive adhesive tape or sheet, comprising:
   a base film that incorporates a first tackifier resin, wherein the base film has a basic material dimensional change rate of not exceeding ±0.5%; and
   a pressure-sensitive adhesive layer formed on at least one face of the base film, said pressure-sensitive adhesive layer incorporates a second tackifier resin that is substantially chemically substantially chemically different from said first tackifier resin.

2. The pressure-sensitive adhesive tape or sheet according to claim 1, wherein the base film further comprises a polyolefin resin.

3. The pressure-sensitive adhesive tape or sheet according to claim 2, wherein the polyolefin resin is selected from the group consisting of polyethylene, polypropylene, a copolymer thereof, and a mixture thereof.

4. The pressure-sensitive adhesive tape or sheet according to claim 1, which comprises the first tackifier in an amount of 1 to 50% by weight.

5. The pressure-sensitive adhesive tape or sheet according to claim 1, wherein the pressure-sensitive adhesive layer comprises a rubber pressure-sensitive adhesive.

6. The pressure-sensitive adhesive tape or sheet according to claim 1 wherein said base film is part of a multilayer substrate.

7. The pressure-sensitive adhesive tape or sheet according to claim 1 wherein said at least one face of the base film is surface treated by corona discharge or plasma treatment.

8. The pressure-sensitive adhesive tape of claim 1 wherein said first tackifier resin is an alicyclic petroleum tackifier resin and wherein said second tackifier resin is a terpene tackifier resin.

9. The pressure-sensitive adhesive tape of claim 2 wherein said first tackifier resin is an alicyclic petroleum tackifier resin and wherein said second tackifier resin is a terpene tackifier resin.

10. The pressure-sensitive adhesive tape of claim 5 wherein said first tackifier resin is an alicyclic petroleum tackifier resin and wherein said second tackifier resin is a terpene tackifier resin.

* * * * *

UNITED STATES PATENT AND TRADEMARK OFFICE
CERTIFICATE OF CORRECTION

PATENT NO.    : 6,455,151 B1
DATED         : September 24, 2002
INVENTOR(S)   : Sakashita et al.

It is certified that error appears in the above-identified patent and that said Letters Patent is hereby corrected as shown below:

Column 7,
Line 55, delete "substantially chemically" second occurrence.

Signed and Sealed this

Eighteenth Day of February, 2003

JAMES E. ROGAN
*Director of the United States Patent and Trademark Office*